US008913737B2

(12) United States Patent
Kawaguchi et al.

(10) Patent No.: US 8,913,737 B2
(45) Date of Patent: Dec. 16, 2014

(54) ECHO CANCELLER AND MICROPHONE APPARATUS

(75) Inventors: Takayoshi Kawaguchi, Kanagawa (JP); Yohei Sakuraba, Kanagawa (JP)

(73) Assignee: Sony Corporation, Tokyo (JP)

( * ) Notice: Subject to any disclaimer, the term of this patent is extended or adjusted under 35 U.S.C. 154(b) by 2156 days.

(21) Appl. No.: 11/505,115

(22) Filed: Aug. 16, 2006

(65) Prior Publication Data

US 2007/0041576 A1 Feb. 22, 2007

(30) Foreign Application Priority Data

Aug. 17, 2005 (JP) ................. P2005-236251

(51) Int. Cl.
*H04M 9/08* (2006.01)

(52) U.S. Cl.
CPC ..................... *H04M 9/082* (2013.01)
USPC ................. 379/406.08; 379/406.12

(58) Field of Classification Search
CPC ... H04M 9/082; H04M 1/2535; H04M 9/085; H04M 1/20; H04B 3/234; H04B 3/23; H04B 3/21; H04B 7/015; H04B 3/20; H04B 3/238; G10L 2021/02082; G10L 19/005; G10L 21/0208; H04R 2410/05; H04R 3/04; H04R 27/00; H03G 3/3005
USPC ............ 379/3, 406, 406.01–406.16; 455/570; 381/71.1–71.14
See application file for complete search history.

(56) References Cited

U.S. PATENT DOCUMENTS

| 5,793,864 | A | * | 8/1998 | Ramsden | 379/406.12 |
| 5,937,060 | A | * | 8/1999 | Oh | 379/406.14 |
| 6,192,126 | B1 | * | 2/2001 | Koski | 379/406.14 |
| 6,449,361 | B1 | * | 9/2002 | Okuda | 379/406.01 |
| 8,391,471 | B2 | * | 3/2013 | Itou | 379/406.05 |
| 2003/0016815 | A1 | * | 1/2003 | Kurtz et al. | 379/406.01 |
| 2004/0086109 | A1 | * | 5/2004 | Takada | 379/406.08 |
| 2005/0129225 | A1 | * | 6/2005 | Piket et al. | 379/406.01 |

FOREIGN PATENT DOCUMENTS

| JP | 7-231282 | 8/1995 |
| JP | 7-288493 | 10/1995 |
| JP | 7-303072 | 11/1995 |
| JP | 3579245 | 7/2004 |
| JP | 2004-289242 | 10/2004 |
| WO | WO 2005/074156 | 8/2005 |

* cited by examiner

*Primary Examiner* — Akelaw Teshale
(74) *Attorney, Agent, or Firm* — Frommer Lawrence & Haug LLP; William S. Frommer

(57) ABSTRACT

An echo canceller for executing adaptive processing for canceling an echo component mixed with an audio input signal includes a volume ratio learner configured to compute a volume ratio between an audio output signal externally outputted and the audio input signal mixed with an echo component caused by reflection of the audio output signal to the audio input signal, thereby learning the volume ratio in a regular status in own apparatus, a double-talk detector configured to detect the double-talk status depending on whether a this-time volume ratio computed this time adapts to a double-talk status predicted by the learning of volume ratio and an echo cancel processor configured to control a learning operation of the echo component for the adaptive processing on the basis of a result of the double-talk status detection by the double-talk detector.

5 Claims, 4 Drawing Sheets

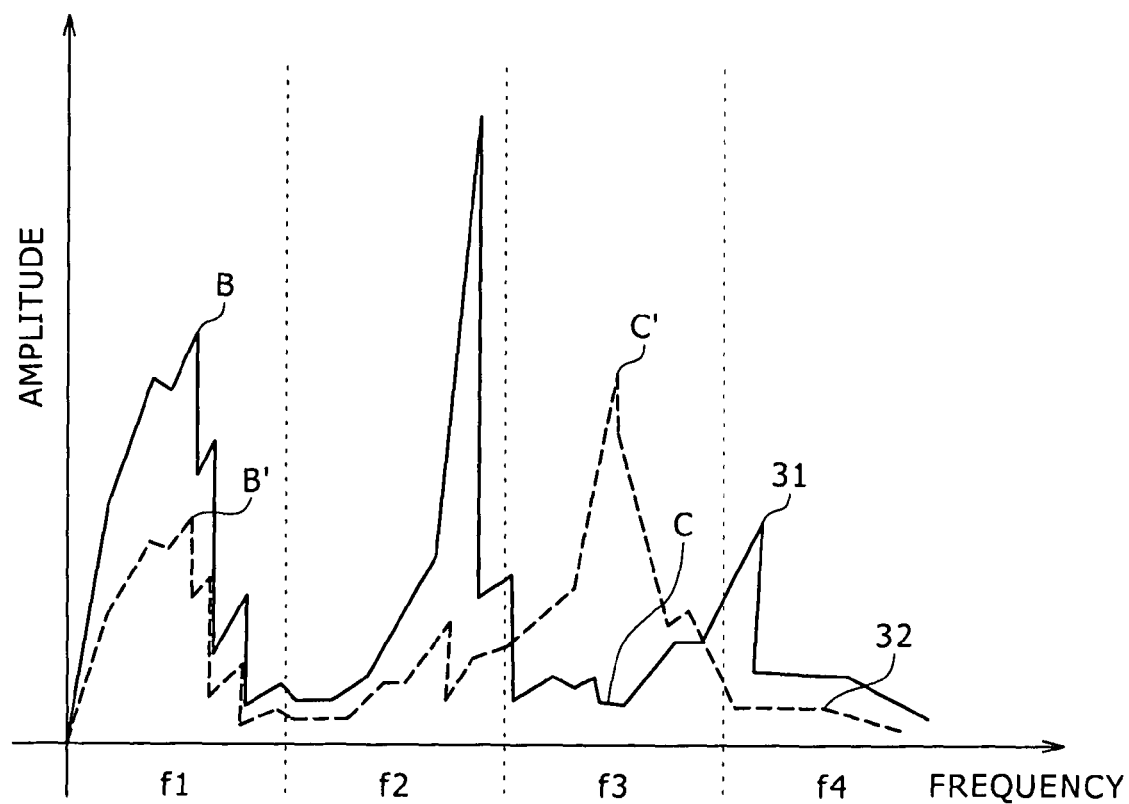

ECHO CANCELLER AND MICROPHONE APPARATUS

CROSS REFERENCES TO RELATED APPLICATIONS

The present invention contains subject matter related to Japanese Patent Application JP 2005-236251 filed in the Japanese Patent Office on Aug. 17, 2005, the entire contents of which being incorporated herein by reference.

BACKGROUND OF THE INVENTION

1. Field of the Invention

The present invention relates to an echo canceller and a microphone apparatus and, more particularly, to an echo canceller that executes adaptive processing for canceling an echo component from an audio input signal and a microphone apparatus having this echo canceller.

2. Description of the Related Art

As typified by a television conference system, conference systems are known in which audio and video signals data are transmitted and received between remotely arranged terminals for remote conferencing. A microphone apparatus (hereafter simply a microphone) for use in conference systems has an audio processing block for processing an audio input signal picked by the microphone. In the audio processing block, an incorporated echo canceller executes processing on an audio input signal picked up by the microphone of a conference system for canceling an echo caused by the reflection of a sound outputted from the speaker of the conference system into the microphone thereof.

The echo canceller such as mentioned above learns the echo component contained in each audio input signal and executes an adaptive operation by use of an adaptive filter, for example, thereby stabilizing the echo cancel processing. In a single-talk state where a single speaker is making a talk, an adaptive operation normally function. However, in a double-talk state where two or more speakers are making a talk, including the first speaker, the audio signals generated by other speakers get mixed, thereby causing the adaptive operation not to function normally. Therefore, executing adaptive processing in the double-talk state cancels not only the echo component but also the voice component of the speakers. To minimize this adverse effect, the echo canceller makes a distinction between single-talk and double-talk and, in the case of double-talk, does not executes the learning for adaptive processing.

One of the methods for making a distinction between single-talk and double-talk is the Geigel algorithm. In this algorithm, a ratio between the volume of an audio signal outputted from a loudspeaker and the volume of an audio signal picked up and inputted by a microphone is computed. If the obtained ratio is less than a predetermined fixed value, it is determined to be single-talk; otherwise, it is determined to be double-talk.

Some echo cancellers monitor a path along which an audio signal inputted from the microphone travels and a path along which an audio signal to be outputted to the loudspeaker travels and, if the audio signals traveling along both the paths continue sounded for more than a predetermined period of time, it is determined to be double-talk (refer to Japanese Patent No. 3579245 (Paragraphs [0047] through [0062], FIG. 6) for example).

SUMMARY OF THE INVENTION

However, related-art echo cancellers involves a problem of sometimes making an erroneous distinction between single-talk and double-talk. For example, since the Geigel algorithm computes a ratio between the volume of an audio signal outputted from the loudspeaker and the volume of an audio signal inputted from the microphone to make a distinction between single-talk and double-talk depending on whether the obtained ratio is below a predetermined fixed value, it is highly possible for this algorithm to make an erroneous decision depending on the volume of the loudspeaker or the positional relationship between the microphone and the loudspeaker.

The technique in which double-talk is determined if both the audio signals at the output and input sides are sounded makes a distinction between sound and silence by making a comparison between each of the volumes and a predetermined threshold. Consequently, this technique may determine sound if the background noise is high and silence if the speaker is fairly away from the microphone or the speaker's utterance level is low, for example, thereby making an error in the determination of double-talk and single-talk.

Therefore, the present invention addresses the above-identified and other problems associated with related-art methods and apparatuses and solves the addressed problems by providing an echo canceller and a microphone apparatus that are capable of surely making a distinction between double-talk and single-talk and surely executing double-talk control.

In carrying out the invention and according to one embodiment thereof, there is provided an echo canceller for executing adaptive processing for canceling an echo component mixed with an audio input signal. This echo canceller has a volume ratio learner, a double-talk detector, and an echo cancel processor. The volume ratio learner computes a volume ratio between an audio output signal externally outputted and the audio input signal mixed with an echo component caused by reflection of the audio output signal to the audio input signal, thereby learning the volume ratio in a regular status. The double-talk detector detects the double-talk status depending on whether a this-time volume ratio computed this time adapts to a double-talk status predicted by the learning of volume ratio. The echo cancel processor controls a learning operation of the echo component for the adaptive processing on the basis of a result of the double-talk status detection by the double-talk detector.

According to the echo canceller having the above-mentioned configuration, the volume ratio learner computes a volume ratio between an audio output signal externally outputted and the audio input signal mixed with an echo component caused by reflection of the audio output signal to the audio input signal, thereby learning the volume ratio in a regular status in own apparatus (in a single-talk status). The double-talk detector detects the double-talk status depending on whether a this-time volume ratio computed this time adapts to a double-talk status predicted by the learning of volume ratio. Namely, in the case of double-talk, it is predicted that the volume ratio be in excess of a volume ratio range in the regular status, so that the volume ratio computed this time is compared with the learned volume ratio range in the regular status to detect double-talk. The echo cancel processor determines whether to execute a learning operation for adaptive control in accordance with a result of the detection by the double-talk detector.

In carrying out the invention and according to another embodiment thereof, there is provided a microphone apparatus for executing audio signal processing including adaptive processing for canceling an echo component mixed with an audio input signal to extract an audio signal of a speaker from the audio input signal. This microphone apparatus has an audio input block configured to convert a picked up audio signal into a digital signal and output the digital signal as an audio input signal; a volume ratio learner configured to compute a volume ratio between an audio output signal externally outputted and the audio input signal mixed with an echo component caused by reflection of the audio output signal to the audio input signal, thereby learning the volume ratio in a regular status in own apparatus; a double-talk detector configured to detect the double-talk status depending on whether a this-time volume ratio computed this time adapts to a double-talk status predicted by the learning of volume ratio; and an audio signal processor configured to extract the audio input signal including a learning operation of the echo component for the adaptive processing on the basis of a result of the double-talk status detection by the double-talk detector.

According to the microphone apparatus having the above-mentioned configuration, a volume ratio is computed between an audio input signal generated by the audio input block and an audio output signal by the volume ratio learner. On the basis of the computed volume ratio, volume ratios of situation-dependent audio input signal and audio output signal in the regular status (or the single-talk status) are learned. Depending on whether the volume ratio computed this time is adaptive to the double-talk status predicted by the volume ratios learned so far, the double-talk detector detects double-talk. The audio signal processor executes audio processing including echo cancel adaptive processing depending on whether the double-talk status has been detected or not, thereby generating an audio signal to be outputted to the outside.

In the embodiments of the present invention, the volume ratio between an audio output signal and an audio input signal is always learned to detect double-talk on the basis of a volume ratio in the double-talk status predicted from this learning, so that double-talk determination can be executed in adaptation to the apparatus concerned. This novel configuration is advantageous in the correct control of double-talk.

BRIEF DESCRIPTION OF THE DRAWINGS

FIG. 2B is a graph illustrating one example of an audio input signal and an audio output signal in a double-talk status.

DETAILED DESCRIPTION OF THE PREFERRED EMBODIMENTS

Figure 1:
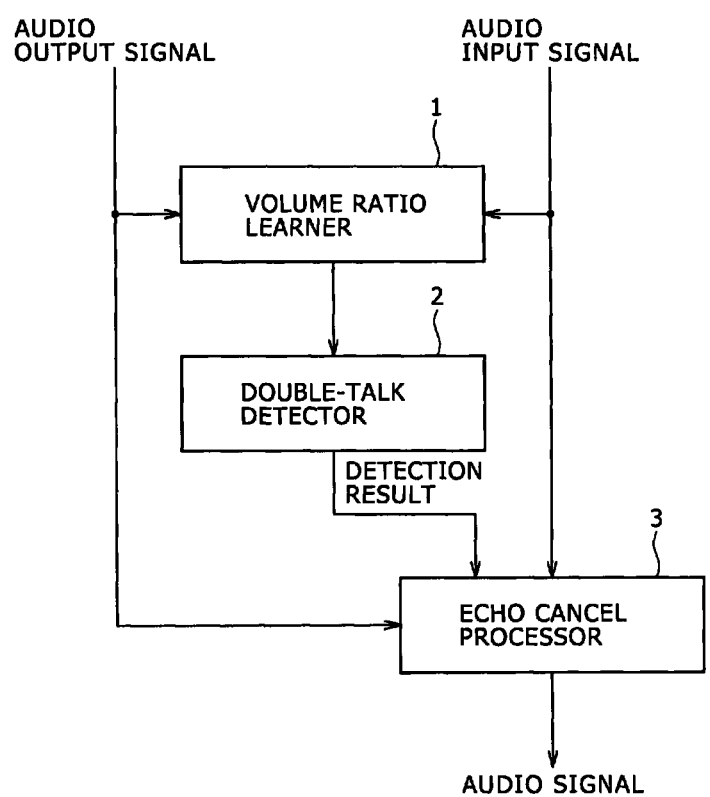
FIG. 1 is a block diagram schematically illustrating one embodiment of the invention.

This invention will be described in further detail by way of embodiments thereof with reference to the accompanying drawings. First, the concept of the invention by which the embodiments described below are practiced will be described, followed by the description of the specific contents of each embodiment. Now, referring to FIG. 1, there is shown the concept of the invention by which the embodiments described below are practiced.

An echo canceller practiced as one embodiment of the invention has a volume ratio learner 1 for learning a volume ratio between an audio output signal and an audio input signal, a double-talk detector 2 for detection a double-talk situation, and an echo cancel processor 3 for executing echo cancel processing.

The volume ratio learner 1 computes a ratio between an audio output signal outputted from a speaker for example and an audio input signal picked up by a microphone for example to learn the volume ratio of a regular situation of the apparatus. This volume ratio is defined by various factors, such as the volume of the loudspeaker from which audio output signals to be outputted, the sensitivity of the microphone that generates audio input signals, and the distance between the microphone and the loudspeaker and varies as time passes. Therefore, the volume ratio between an audio input signal and an audio output signal is constantly monitored to learn the volume ratio of the current regular situation of the apparatus. It should be noted that the learning is executed by dividing the signals into predetermined frequency ranges and on the basis of each of the frequency ranges. The volume ratio is herein computed for each frequency range in accordance with equation (1) below:

$$\text{Volume ratio} = \text{the signal level of audio input signal}/\text{the signal level of audio output signal} \qquad (1)$$

Also, in the computation of the volume ratio, a delay time is considered in which the audio output signal is reflected to be mixed with the audio input signal. Further, the learning need not be executed for a frequency range in which the loudspeaker does not output an audio signal.

It should be noted that the learning is executed in the regular situation, namely, in the single-talk situation. In an actual talk on the conference system or the telephone, the time is mostly occupied by the talk by a single speaker or no talk at all. Therefore, if there occurs a drastic change in a computed volume ratio, then the volume ratio of the regular status is learned without considering this drastically changed volume ratio. In addition, the learning of the regular status can be executed more correctly if it is determined whether to execute the learning or not in accordance with a related-art double-talk determination technique, such as the Geigel algorithm, namely, on the basis of a result of the double-talk determination made by checking whether the volume ratio has exceeded a predetermined threshold this time. The volume ratio computed this time and the information about the learned volume ratio are outputted to the double-talk detector 2.

On the basis of the volume ratio computed this time and the information about the learned volume ratio received from the volume ratio learner 1, the double-talk detector 2 detects for the double-talk status. As described above, the learning associated with the volume ratio of the single-talk status is executed in the volume ratio learner 1. In the double-talk status, an audio signal of another speaker is superimposed on the audio input signal; therefore, the volume ratio obtained by equation (1) above gets higher than that in the single-talk status. Consequently, double-talk can be predicted if the computed volume ratio is found exceeding the volume ratio range of the single-talk status learned by the volume ratio learner 1. Therefore, on the basis of the volume ratio range of the single-talk status, a threshold over which double-talk is assumed is specified. The double-talk detector 2 determines for each frequency range whether the volume ratio computed this time adapts to the volume ratio of double-talk predicted from the volume ratio range of the single-talk status. If double-talk is detected in a predetermined frequency range, the double-talk detector 2 determines the double-talk status. The result of this determination is supplied to the echo cancel processor 3.

Receiving an audio input signal, the echo cancel processor 3 cancels an echo caused by the reflecting of the audio output signal outputted from the loudspeaker for example onto the audio input signal. The echo component is an audio signal component that is detected by the apparatus in a conference system or a telephone for example, transmitted to a mate apparatus, outputted therefrom, and reflected to the apparatus as the audio input signal. Therefore, adaptive processing is executed in which the echo component is learned by use of an audio output signal outputted from the loudspeaker and the echo component that is predicted from the learning result is cancelled from the audio input signal. At this moment, the sound outputted from the loudspeaker reaches the microphone with some delay, so that this delay is taken into account in this adaptive processing. It should also be noted that the learning is executed when the double-talk detector 2 is not detecting double-talk, namely, in the single-talk situation. This is because, in the case of double-talk, an audio signal of another speaker is mixed with the audio input signal, thereby making it difficult to correctly execute the learning.

In the echo canceller configured as described above, the volume ratio learner 1 computes the ratio (or the volume ratio) between an audio output signal and an audio input signal in each frequency range separately and learns the range of volume ratios in the single-talk status on the basis of the computed volume ratio.

Figure 2A:
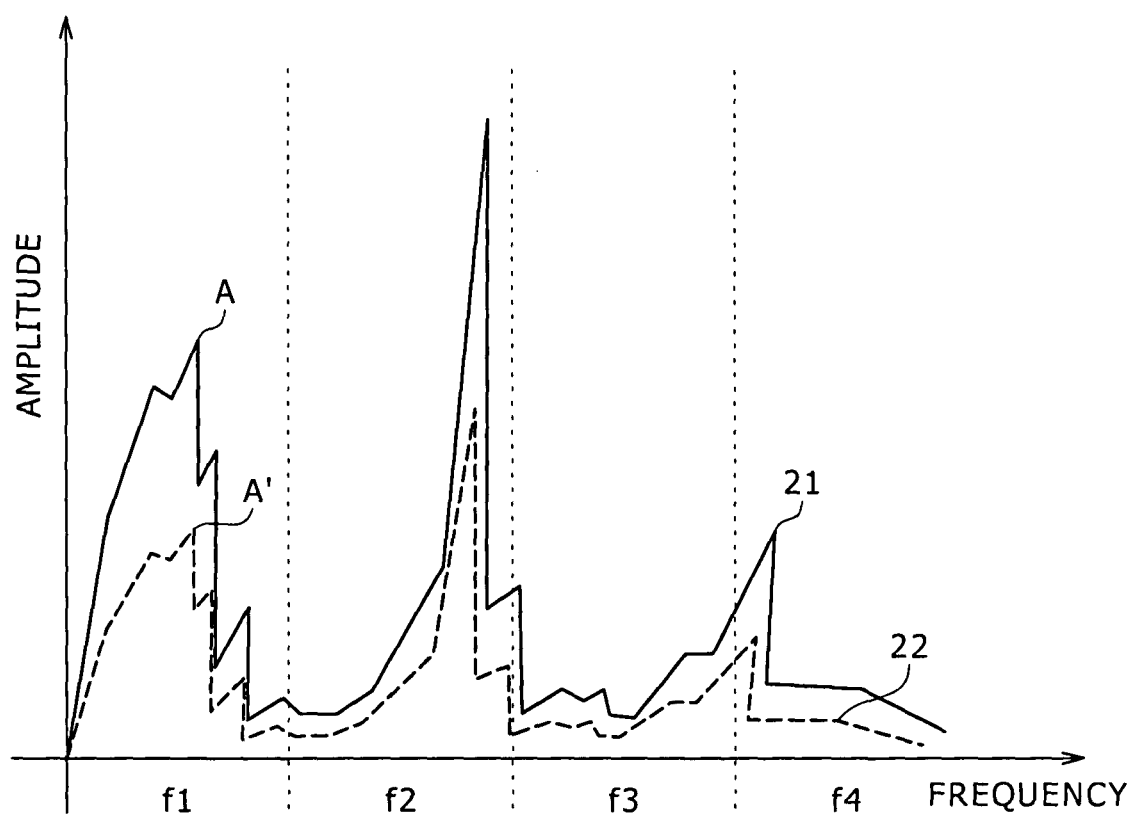
FIG. 2A is a graph illustrating one example of an audio input signal and an audio output signal in a single-talk status.

Referring to FIG. 2A, there is shown an example of an audio input signal and an audio output signal in the single-talk status.

The volume ratio learner 1 computes a ratio (or a volume ratio) between signal levels of an audio output signal (hereafter referred to as an output signal) 21 and an audio input signal (hereafter referred to as an input signal) 22 in each of frequency ranges f1, f2, f3, and f4 in accordance with equation (1) shown above. For example, in frequency range f1 in the example shown in FIG. 2A, a ratio between maximum amplitude level A of the output signal 21 and maximum amplitude level A' of the input signal 22 is approximately 0.5. Likewise, a volume ratio of 0.5 is obtained for each of frequency ranges f2, f3, and f4. Thus, the volume ratio between input signal and output signal is computed for each frequency range to learn the volume ratios. It should be noted that the learning is executed when the single-talk status is detected by the Geigel algorithm, for example.

It is assumed by the above-mentioned processing procedure that values in the proximity of 0.5 have been obtained as the volume ratios in the single talk status in frequency ranges f1, f2, f3, and f4 as a result of the learning. The double-talk detector 2 determines whether each computed volume ratio is in excess of 0.5+α (α being a margin that is set in accordance with the system used). If the volume ratio is found not in excess of this level, then the single-talk status is determined. If the single-talk status is determined, the echo cancel processor 3 learns the echo component on the basis of the output signal and, on the basis of the echo component estimated as a result of the learning, executes the processing of canceling the component in the input signal.

Now, suppose that a double-talk status has occurred in the above-mentioned situation. Referring to FIG. 2B, there is shown an example of an audio input signal and an audio output signal in the double-talk status.

In the case of double-talk, an output signal 31 is an audio signal outputted from the loudspeaker for example as shown in FIG. 2A. In the case of an input signal 32, an audio signal of another speaker is superimposed on an original input signal (the audio signal of the speaker+an echo component caused by the reflection of the output signal 31).

The volume ratio learner 1 computes a ratio between signal levels of the output signal 31 and the audio input signal 32 in each of frequency ranges f1, f2, f3, and f4 in accordance with equation (1) shown above. In frequency range f1 in the example shown in FIG. 2B, the ratio between maximum amplitude level B of the output signal 31 and the maximum amplitude level B' of the input signal 32 is approximately 0.5. This value is the same as that of the single-talk status shown in FIG. 2A. However, in frequency range f3, the ratio between maximum amplitude level C of the output signal 31 and maximum amplitude level C' of the input signal is approximately 7, which is significantly different from 0.5 in the single-talk status.

If, in the double-talk detector 2, matching is executed between the volume ratio computed by the volume ratio learner 1 and the volume ratio range in the learned single-talk status, it is indicated that, in frequency ranges f1 and f2, the volume ratios are approximately the same as those in the single-talk status; however, in frequency range f3, the volume ratio is significantly in excess of that in the single-talk status. Therefore, this is determined to be the double-talk status. If the double-talk status is determined, the echo cancel processor 3 stops learning the echo component on the basis of the output signal and executes the processing of canceling the echo component in the input signal on the basis of the estimated echo components learned so far.

The frequency distribution of the voice of each speaker often differs from one speaker to another. For example, if the audio level of another speaker superimposed in the double-talk status is relatively low, the double-talk status cannot be sometimes detected if matching is made with the volume ratio of the entire signal. Therefore, a plurality of frequency ranges area provided and the processing is executed on each of these frequency ranges. The difference in the volume ratio can be detected in a distinctive frequency range to determine a double-talk status.

As described above, the volume ratio between an input signal and an output signal in the regular status is learned for each of predetermined frequency ranges and a volume ratio of double-talk estimated from the result of the learning is compared with the volume ratio computed this time, thereby detecting a double-talk status. This configuration allows the detection of double-talk with an optimum threshold corresponding to the situation of the apparatus. In addition, because the volume ratio is computed for each of frequency ranges, the accuracy of detection can be enhanced.

It should be noted that the determination whether to execute the learning or not is made by use of another double-talk detection algorithm; however, even if the determination errs more or less, the continuance of the learning enhances the accuracy of the final double-talk determination.

The following describes a microphone of a television conference system practiced as one embodiment of the invention with reference to drawings.

Figure 3:
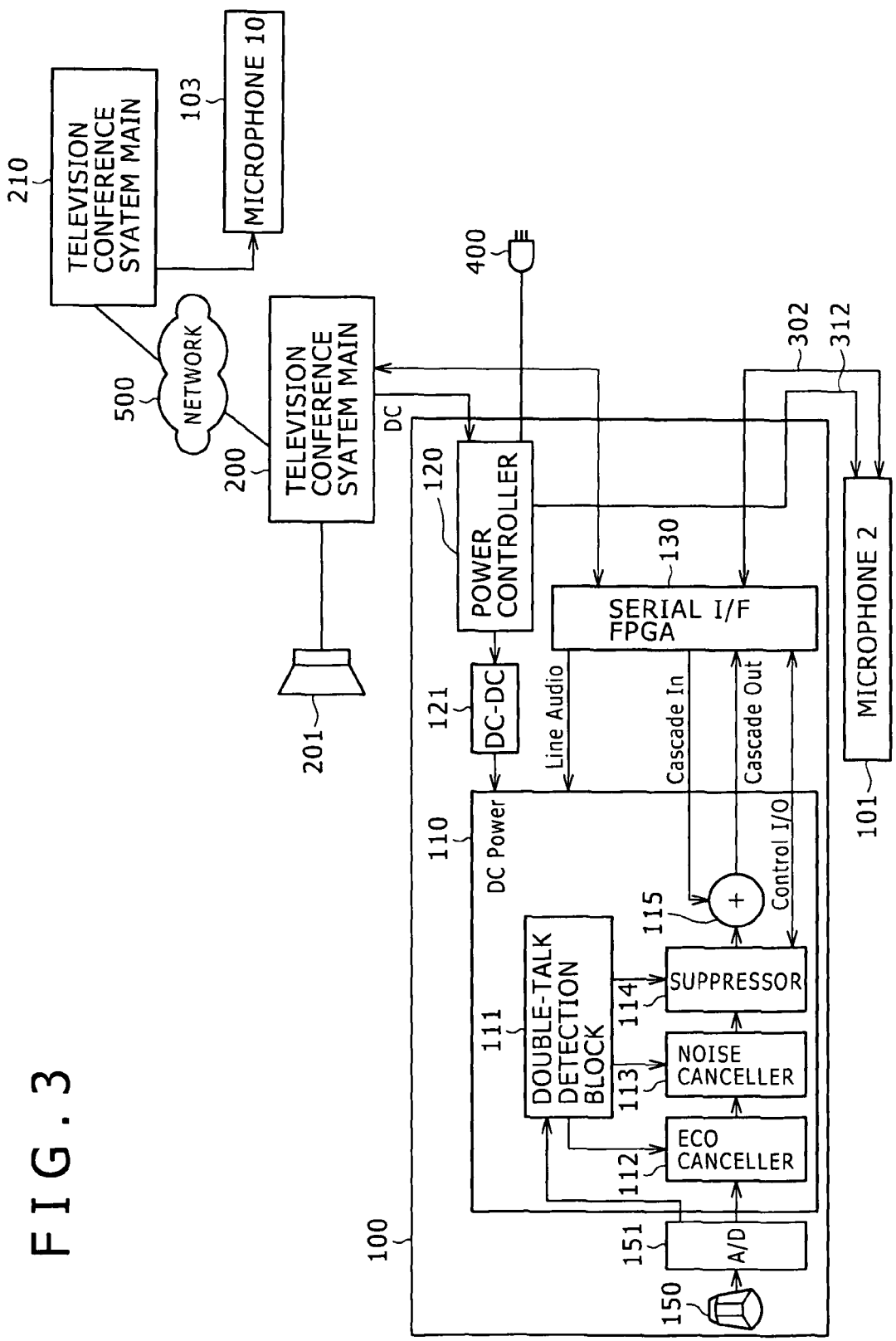
FIG. 3 is a block diagram illustrating an exemplary configuration of a television conference system practiced as one embodiment of the invention.

Referring to FIG. 3, there is shown an exemplary configuration of the television conference system practiced as one embodiment of the invention.

With the television conference system practiced as one embodiment of the invention, a microphone 1 (100) and a microphone 2 (101) are cascaded to a television conference system main (hereafter referred to as a main) 200 via communication paths 301 and 302 and power supply signal paths 311 and 312, respectively. The main 200 is also connected, via a network 500, to a television conference system made up of a main 210 and a microphone 10 (103) placed in a different room. These microphones are identical with each other in configuration, so that the description will be made by representatively use of the microphone 1 (100) for example.

The microphone 1 (100) has a DSP (Digital Signal Processor) 110 for executing audio processing, a power controller 120 and a DC-DC converter 121 for executing power supply processing, a serial I/F FPGA (Field Programmable Gate Array) 130 for controlling serial communication, a voice pickup block 150 through which voice is inputted, and an A/D converter 151. In what follows, the serial I/F FPGA 130 is referred to as serial I/F 130.

The DSP 110 has a double-talk detection block 111, an echo canceller 112, a noise canceller 113, a suppressor 114, and an adder 115.

The double-talk detection block 111, configured by the volume ratio learner 1 and the double-talk detector 2, learns a volume ratio between an output signal and an input signal of each of frequency ranges, checks for a double-talk status by use of the learning result and the volume ratio computed this time, and outputs the result of the checking to the echo canceller 112, the noise canceller 113, and the suppressor 114. The echo canceller 112 executes adaptive control for predicting an echo component to cancel the echo. If the double-talk status is detected by the double-talk detection block, the learning for adaptive control is not executed. The noise canceller 113 cancels noise from the input signal from which echo has been cancelled by he echo canceller 112. The suppressor 114 cancels the audio output signal if the input signal contains no audio signal. The noise canceller 113 and the suppressor 114 reference the result of the double-talk detection by the double-talk detection block 111 as occasion demands, thereby executing the processing of each. The adder 115 adds the audio information (Cascade In) of another cascaded microphone inputted from the serial I/F 130 to the audio signal of the microphone to transmit a resultant audio signal (Cascade Out) over the serial I/F 130. Control commands are inputted via the serial I/F 130 by a controller, not shown, thereby executing the processing in accordance with the inputted commands (Control I/O). It should be noted that the DSP 110 generates an operation clock in accordance with the downstream data inputted via the serial I/F 130.

The power controller 120 supplies DC power supplied from the upstream main 200 to the DC-DC 121 and determines whether to supply DC power to the downstream. If the power supply to the downstream is found necessary, the power controller 120 executes control for supplying DC power to the microphone 2 (101) via the power signal path 312. At this moment, the determination for downstream power supply is made by considering whether an external DC power supply 400 is connected to the own microphone and the length of the power signal path connecting to the downstream.

The serial I/F 130 inputs downstream data transmitted from the main 200 to execute predetermined processing on the data and outputs the processed data to the downstream microphone 2 (101). Also, the serial I/F 130 executes processing such as adding the audio signal of the own microphone to the audio information of the upstream data inputted from the downstream microphone 2 (101), outputting the processed audio information to the upstream main 200. In what follows, the downstream data and the upstream data to be communicated are generically referred to a communication commands.

The voice pickup block 150 picks up external voice and transmits the picked up voice signal to the A/D converter 151. The A/D converter 151 converts the analog voice signal generated by the voice pickup block 150 into a digital signal and outputs this signal to the echo canceller 112.

The main 200 exchanges information with the cascaded microphone 1 (100) and microphone 2 (101) via communication commands to manage these microphones. The main 200 has a loudspeaker 201 to output audio signals.

The external DC power supply 400 is connected to each microphone as occasion demands, supplying DC power to the connected microphone.

The following describes operations of the television conferencing system having the above-mentioned configuration. The following description is made about operations of the microphones and the microphone system with focus placed on the audio processing by the DSP 110.

The voice pickup block 150 inputs voice therearound, generates an analog signal based on the inputted voice, and outputs the generated analog signal to the A/D converter 151. The A/D converter 151 converts the analog signal generated on the basis of the inputted voice into a digital signal and outputs the digital signal to the DSP 110 as an audio input signal.

In the DSP 110, the double-talk detection block 111 learns the volume ratio between an audio output signal inputted via the serial I/F 130 and an audio input signal inputted via the A/D converter 151 in the single-talk status and detects the double-talk status in accordance with the result of the learning. If no double-talk status has been detected by the double-talk detection block 111, the echo canceller 112 executes the learning for adaptive control and cancels the echo component from the audio input signal, thereby generating an audio signal. This audio signal is further noise-cancelled by the noise canceller 113 and the noise-cancelled signal is suppressed by the suppressor 114 to be outputted to the adder 115. The adder 115 adds the audio signal inputted via the suppressor 114 to the audio signal (Cascade In) of the downstream microphone inputted via the serial I/F 130 and outputs the resultant signal (Cascade Out).

As described above, in order to correctly execute echo cancel processing for canceling the echo component from an input signal picked up by the voice pickup block 150 caused by the mixture of a reflected output signal outputted from the loudspeaker 201, the microphone apparatus practiced as one embodiment of the invention executes operation control based on the difference between single-talk and double-talk. The double-talk detection block 111 computes the volume ratio between an output signal and an input signal for each of frequency ranges and learns the volume ratio in the single-talk status beforehand. Then, the double-talk detection block 111 matches the computed volume ratio against the result of the learning to detect the double-talk status. This novel configuration allows the correction detection of double-talk in adaptation to the volume of the loudspeaker 201, the sensitivity of the voice pickup block 150, or the variation in volume ratio due to the positional relationship between the loudspeaker 201 and the voice pickup block 150. In addition, the determination of a volume ratio is independently executed on a frequency range basis, thereby enhancing the accuracy of the detection.

While preferred embodiments of the present invention have been described using specific terms, such description is for illustrative purpose only, and it is to be understood that changes and variations may be made without departing from the spirit or scope of the following claims.

What is claimed is:

1. An echo canceller for executing adaptive processing for canceling an echo component mixed with an audio input signal, comprising:

a volume ratio learner configured to compute a volume ratio in each of a plurality of predetermined frequency ranges between an audio output signal externally outputted and said audio input signal mixed with an echo component caused by reflection of said audio output signal to said audio input signal, thereby learning said volume ratio in a regular status in own apparatus, wherein the volume ratio, which is computed for each of the plurality of predetermined frequency ranges, the plurality of predetermined frequency ranges composing entire frequency region, is computed between a maximum value of the audio output signal in the corresponding frequency range and a maximum value of the audio input signal mixed with the echo component in the corresponding frequency range;

a double-talk detector configured to detect said double-talk status depending on whether a this-time volume ratio computed this time adapts to a double-talk status predicted by said learning of volume ratio based on a volume ratio range of a single-talk status learned by the volume ratio learner, wherein said double-talk detector divides said audio input signal and said audio output signal each into the plurality of predetermined frequency ranges composing the entire frequency region to execute the processing on a predetermined frequency range basis; and an echo cancel processor configured to control a learning operation of said echo component for said adaptive processing on the basis of a result of said double-talk status detection by said double-talk detector.

2. The echo canceller according to claim 1, wherein said volume ratio learner divides said audio input signal and said audio output signal each into the plurality of predetermined frequency ranges to execute the processing on a predetermined frequency range basis.

3. The echo canceller according to claim 1, wherein said volume ratio learner determines whether to execute the learning depending on a result of double-talk determination based on whether said this-time volume ratio is in excess of a predetermined threshold.

4. The echo canceller according to claim 1, wherein said volume ratio learner executes said learning of audio ratio by considering a delay time in which said audio output signal is reflected to be mixed with said audio input signal.

5. A microphone apparatus for executing audio signal processing including adaptive processing for canceling an echo component mixed with an audio input signal to extract an audio signal of a speaker from said audio input signal, comprising:

an audio input block configured to convert a picked up audio signal into a digital signal and output said digital signal as an audio input signal;

a volume ratio learner configured to compute a volume ratio in each of a plurality of predetermined frequency ranges between an audio output signal externally outputted and said audio input signal mixed with an echo component caused by reflection of said audio output signal to said audio input signal, thereby learning said volume ratio in a regular status in own apparatus, wherein the volume ratio, which is computed for each of the plurality of predetermined frequency ranges, the plurality of predetermined frequency ranges composing entire frequency region, is computed between a maximum value of the audio output signal in the corresponding frequency range and a maximum value of the audio input signal mixed with the echo component in the corresponding frequency range;

a double-talk detector configured to detect said double-talk status depending on whether a this-time volume ratio computed this time adapts to a double-talk status predicted by said learning of volume ratio based on a volume ratio range of a single-talk status learned by the volume ratio learner, wherein said double-talk detector divides said audio input signal and said audio output signal each into the plurality of predetermined frequency ranges composing the entire frequency region to execute the processing on a predetermined frequency range basis; and an audio signal processor configured to extract said audio signal from said audio input signal including a learning operation of said echo component for said adaptive processing on the basis of a result of said double-talk status detection by said double-talk detector.

* * * * *